US010100192B2

(12) United States Patent
Zhou et al.

(10) Patent No.: US 10,100,192 B2
(45) Date of Patent: Oct. 16, 2018

(54) COMPLETELY NON-HALOGENATED FLAME RETARDANT POLYCARBONATE COMPOUNDS

(71) Applicant: PolyOne Corporation, Avon Lake, OH (US)

(72) Inventors: Chongfu Zhou, Avon, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 231 days.

(21) Appl. No.: 14/897,283

(22) PCT Filed: Jun. 12, 2014

(86) PCT No.: PCT/US2014/042079
§ 371 (c)(1),
(2) Date: Dec. 10, 2015

(87) PCT Pub. No.: WO2014/201224
PCT Pub. Date: Dec. 18, 2014

(65) Prior Publication Data
US 2016/0122534 A1    May 5, 2016

Related U.S. Application Data

(60) Provisional application No. 61/834,817, filed on Jun. 13, 2013.

(51) Int. Cl.
*C08L 69/00* (2006.01)
*C08L 83/04* (2006.01)
*C08G 77/12* (2006.01)
*C08G 77/20* (2006.01)
*C08K 5/42* (2006.01)
*B33Y 10/00* (2015.01)
*B33Y 70/00* (2015.01)
*B33Y 80/00* (2015.01)

(52) U.S. Cl.
CPC .............. *C08L 69/00* (2013.01); *C08L 83/04* (2013.01); *B33Y 10/00* (2014.12); *B33Y 70/00* (2014.12); *B33Y 80/00* (2014.12); *C08G 77/12* (2013.01); *C08G 77/20* (2013.01); *C08K 5/42* (2013.01); *C08L 2205/02* (2013.01)

(58) Field of Classification Search
CPC ............ C08L 69/00; C08L 83/04; C08K 5/42
See application file for complete search history.

(56) References Cited

U.S. PATENT DOCUMENTS

| | | |
|---|---|---|
| 3,931,100 A | 1/1976 | Mark |
| 3,933,734 A | 1/1976 | Mark et al. |
| 4,596,832 A | 6/1986 | Ariga et al. |
| 4,710,549 A | 12/1987 | Pettigrew |
| 4,714,739 A * | 12/1987 | Arkles .................. C08G 77/42 525/101 |
| 4,720,533 A | 1/1988 | Pettigrew |
| 4,849,469 A * | 7/1989 | Crosby ............... B29C 47/0004 524/400 |
| 5,039,772 A * | 8/1991 | Davis .................. C08G 64/186 528/15 |
| 5,973,041 A | 10/1999 | Campbell et al. |
| 6,013,686 A | 1/2000 | Hamilton et al. |
| 6,339,166 B1 | 1/2002 | Allcock et al. |
| 6,392,008 B1 | 5/2002 | Allcock et al. |
| 6,518,336 B1 | 2/2003 | Yabuhara et al. |
| 6,518,357 B1 | 2/2003 | Rajagopalan et al. |
| 6,743,841 B2 | 6/2004 | Shimizu et al. |
| 6,790,887 B1 | 9/2004 | Nishihara |
| 7,300,975 B2 | 11/2007 | Nodera et al. |
| 7,449,506 B2 | 11/2008 | Sato |
| 7,645,850 B2 | 1/2010 | Freitag |
| 7,816,486 B2 | 10/2010 | Freitag et al. |
| 7,985,788 B2 | 7/2011 | Shinagawa et al. |
| 8,101,678 B2 | 1/2012 | Roth |
| 8,158,701 B1 | 4/2012 | Gallucci et al. |
| 8,236,881 B2 | 8/2012 | Roth |
| 8,372,902 B2 | 2/2013 | Lin et al. |
| 8,748,521 B2 | 6/2014 | Taschner et al. |
| 8,871,858 B2 | 10/2014 | Volkers et al. |
| 9,073,950 B2 | 7/2015 | Kownacka et al. |
| 2003/0220515 A1 | 11/2003 | Yoshifumi et al. |
| 2004/0176506 A1 | 9/2004 | Sicken et al. |
| 2007/0191519 A1 | 8/2007 | Jiao et al. |
| 2014/0200349 A1 | 7/2014 | Brandstadt et al. |
| 2014/0249311 A1 | 9/2014 | Brandstadt et al. |
| 2016/0272812 A1 | 9/2016 | Zhou et al. |

OTHER PUBLICATIONS

Puyenbroek et al.: "Synthesis of Phosphazene-Substituted Polysiloxanes," Journal of Inorganic and Organometallic Polymers, 1991, pp. 105-114, vol. 1, No. 1, Plenum Publishing Corporation.
Hamdani et al.: "Flame Retardancy of Silicone-Based Materials," Polymer Degradation and Stability, 2009, vol. 94, No. 4, pp. 465-495.
Tang et al.: "Oligomeric Siloxane Containing Triphenylphosphonium Phosphate as a Novel Flame Retardant for Polycarbonate," Polymer Degradation and Stability, 2012, vol. 97, No. 4, pp. 638-644.

* cited by examiner

*Primary Examiner* — John E Uselding
(74) *Attorney, Agent, or Firm* — Michael J. Sambrook; John H. Hornickel

(57) ABSTRACT

A completely non-halogenated flame retardant polycarbonate compound includes polycarbonate, non-halogenated termini-functional chemical such as vinyl-terminated siloxane and non-halogenated hydride-functional polysiloxane as non-halogenated drip suppressant ingredients which react in the presence of heat to form a drip suppressant adduct, and potassium 3-(phenylsulfonyl)benzenesulfonate as a non-halogenated char former. The compound can achieve a UL 94 rating of V-0 at a thickness of at least 3.2 mm and otherwise achieves no dripping/igniting of the cotton indicator during that test.

8 Claims, No Drawings

COMPLETELY NON-HALOGENATED FLAME RETARDANT POLYCARBONATE COMPOUNDS

CLAIM OF PRIORITY

This application claims priority from U.S. Provisional Patent Application Ser. No. 61/834,817 and filed on Jun. 13, 2013, which is incorporated by reference.

FIELD OF THE INVENTION

This invention concerns thermoplastic polymer compounds which are flame retardant using non-halogenated ingredients.

BACKGROUND OF THE INVENTION

Thermoplastic compounds, unlike wood, metal, or glass, do not rot, rust, or shatter. For that reason, the world in the past seventy years has seen a revolution in material science arising from the combination of a thermoplastic resin and one or more functional additives to provide specific properties to the resin.

Unlike wood but like metal and glass, at a given temperature, a thermoplastic resin can melt. Its processing versatility benefits from its capacity to mix with the functional additives while in a molten state.

But in use, the exposure of a fully formed thermoplastic article to excessive heat or flame can be quite detrimental to property and person.

Flame retardants, drip suppressants, mineral fillers, and char formers are functional additives which can be used to help the thermoplastic compound to retard the effects of heat or flame from melting or even burning. Flame retardant thermoplastic compounds are particular needed when the plastic article is used in any confined space where persons might be present during any condition, planned or emergency, which might expose the plastic article to such excessive heat or flame.

Non-halogenated flame retardants have recently become popular because they minimize the release of halogenated chemicals if the plastic article would begin to degrade, melt, or burn.

To reduce the possibility of the plastic article dripping as it melts, polytetrafluoroethylene (PTFE) is often used as a drip suppressant. But PTFE, even in very small amounts, is a halogenated material, albeit fluorinated rather than chlorinated.

SUMMARY OF THE INVENTION

What the art needs is a completely non-halogenated thermoplastic compound capable of passing the Underwriters' Laboratories Test No. 94 (UL 94 test) by achieving a V-0 rating.

Even with the variety of functional additives commercially available, it is not a predictable pathway for a person having ordinary skill in the art to find a particular combination of ingredients which, together, can achieve a V-0 rating in a UL 94 test without the use of any drip suppressant, flame retardant, or char former which contains any halogen atom.

The present invention has found a particular combination of known ingredients which, together, achieve a V-0 rating in a UL 94 test, at a thickness of about 3.2 mm (0.125 inches).

Starting with polycarbonate as the thermoplastic resin chosen for its physical properties, a non-halogenated flame retardant is combined with other functional ingredients to achieve that coveted V-0 rating.

One aspect of the invention is a completely non-halogenated flame retardant polycarbonate compound, comprising (a) polycarbonate homopolymer or copolymer, (b) non-halogenated termini-functional chemical, (c) non-halogenated hydride-functional polysiloxane, and optionally (d) potassium 3-(phenylsulfonyl)benzenesulfonate if a polycarbonate homopolymer is used, wherein the non-halogenated termini-functional chemical is present in the compound in at least one percent by weight if a polycarbonate homopolymer is used.

For purposes of this invention, "termini-functional" means a chemical with more than one terminus have a functionality or end group reactive to hydrosilylation, as described in greater detail below. The termini-functional chemical can have the same or different reactive functionalities on the various termini of the chemical structure of the chemical. The termini can be unsaturated functionalities along repeating units of the chain of a polymer or at the ends of the polymer or both. In that respect, however, any chemical with more than one reactive functionality which can form a crosslinking structure between two other chemicals or two molecules of the same chemical via a hydrosilylation reaction qualifies that crosslinkable chemical as a termini-functional chemical of the present invention. A number of termini-functional chemicals are identified below, including termini-functional chemicals which are telechelic, in that the same functionality is present at the termini of the chemical.

Features of the invention will be explored below.

EMBODIMENTS OF THE INVENTION

Polycarbonate

Any polycarbonate is a candidate for use in the compound, whether obtained from petrochemical or bio-derived sources, whether virginal or recycled.

Polycarbonates can be branched or linear, a mixture of them being preferred in this invention. Polycarbonates can be aliphatic or aromatic, with the latter being preferred in this invention. Without undue experimentation, one of ordinary skill in the art can select a polycarbonate matrix based on considerations of cost, manufacturing technique, physical properties, chemical properties, etc.

Unpredictably, it has been found that a combination of branched and linear polycarbonate in compounds of the present invention performs better than only either branched polycarbonate or linear polycarbonate. Linear polycarbonate has a higher melt flow index than branched polycarbonate, and it is believed that the linear polycarbonate assists in the melt processing of the compound while the branched polycarbonate assists in the flame retardant performance.

Commercial manufacturers of polycarbonate are Sabic, Bayer, Teijin, Dow, and others.

Another type of polycarbonate has been shown to work in this invention, a polyphosphonate-co-carbonate, in which the polyphosphonate provides non-halogenated flame retardance as a part of the polycarbonate resin.

Polyphosphonate-co-carbonate is a copolymer described in U.S. Pat. No. 7,645,850 (Freitag), which disclosure is incorporated by reference herein.

As explained in U.S. Pat. No. 7,645,850, polyphosphonate-co-carbonate is formed from at least one phosphonate oligomer or polyphosphonate block covalently linked to polycarbonate, wherein the covalent linkages are between the at least one phosphonate oligomer or polyphosphonate and the polycarbonate to provide a copolymer having a single glass transition temperature (Tg). Though Freitag discloses block copolymers, random copolymers can also be formed.

The following formula identifies the structure of the phosphonate oligomer or polyphosphonate block.

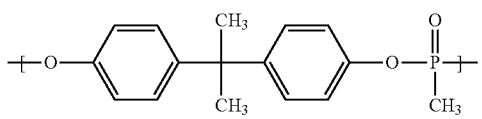

The polyphosphonate-co-carbonate can have a weight average molecular weight (according PC standards) ranging from about 30,000 to about 50,000; a glass transition temperature ranging from about 120° C. to about 133° C.; a percentage phosphorus content of about 3.8 to about 6.5 weight percent of the polyphosphonate-co-carbonate; and a Limiting Oxygen Index ranging from about 40% to about 50%.

Two grades of polyphosphonate-co-carbonate have been publicized by FRX Polymers, Inc. of Chelmsford, Mass., USA: Nofia™ CO3500 and Nofia™ CO6000. Additional grades have also been identified that are oligomeric, these and/or blends of them can be used. Both of these grades are suitable for use in this invention, because they provide a non-halogen flame retardance and contribute to the improvement in heat resistance. Any grade between them is also acceptable for use, if available commercially. Alternatively, the polyphosphonate-co-carbonate can be a blend of two different polyphosphonate-co-carbonates.

In-Situ Reaction Product of Non-Halogenated Termini-functional Chemical and Hydride-Functional Siloxane To serve as a non-halogenated drip suppressant, two ingredients of the compound await the flammable conditions before they react to become non-flammable. For purposes of this invention, "non-flammable" means a composition of matter having a Limiting Oxygen Index of greater than 22% according to ASTM Test D2863.

Non-Halogenated Termini-functional Chemical

The first ingredient is, broadly, any suitable non-halogenated chemical having termini-functional functionality, such as unsaturated hydrocarbons, siloxanes, or other chemical moieties, having vinylic, alkynyl, acrylic, allyl, or acetylenic functionality. Non-limiting examples of such termini-functional chemicals are acrylates, vinyl and allyl esters, allyl and vinyl ethers terminal and internal acetylenics, allyl and vinyl functional oligomers, polymers, or monomers.

Suitable siloxanes are hydride terminated polydimethylsiloxanes, methyl hydrosiloxane-dimethylsiloxane copolymers which are trimethylsiloxy terminated, polymethylhydrosiloxanes which are trimethylsiloxy terminated, triethyl terminated ethyl hydrogen silicone fluid, hydrogen terminated triethyl polydimethylsiloxane fluid, hydrogen terminated polydiphenyl siloxane, hydride terminated methylhydrosiloxane dimethylsiloxane copolymer, hydride terminated methylhydrosiloxane dimethylsiloxane copolymer, hydride terminated poly(phenyl-dimethylsiloxy)siloxane, phenyl silsequioxane which is hydrogen terminated, hydride terminated poly(methyl-phenyl)siloxane, trimethyl or hydrogen terminated dimethyl methylhydrogen methyl phenyl polysiloxane copolymer, trimethyl or hydrogen terminated dimethyl methylhydrogen diphenyl polysiloxane copolymer, Hydride Q Resin. or methylhydrosiloxane-octylmethylsiloxane copolymers and terpolymers or combinations thereof. Suitable vinyl silicone chemicals include vinyl terminated polydimethylsiloxanes, trimethyl terminated poly(methylvinyl)siloxane, trimethyl terminated vinylmethyl-dimethyl polysiloxane copolymers, monovinyldimethyl terminated vinylmethyl-dimethyl polysiloxane copolymers, vinyldimethyl terminated vinylmethyl-dimethyl polysiloxane copolymers, methylvinylphenyl terminated dimethyl-methylvinyl polysiloxane copolymer, methylvinylphenyl terminated methylphenyl-methylvinyl polysiloxane copolymer, vinyldimethyl terminated poly(methylphenyl)siloxane, vinyldimethyl terminated dimethyl-diphenyl polysiloxane copolymer, vinyldimethyl terminated dimethyl-methylvinyl-methylphenyl polysiloxane copolymer, vinyldimethyl terminated dimethyl-methylvinyl-diphenyl polysiloxane copolymer, vinyl terminated diethylsiloxane-dimethylsiloxane copolymers, silanol terminated (4-6% OH) vinylmethylsiloxane-dimethylsiloxane copolymers, vinyl gums, vinyl Q resins dispersions, vinyl T-structure polymers, vinylmethylsiloxane terpolymers, (3-5% vinylmethylsiloxane)-(35-40% octylmethylsiloxane)-(dimethylsiloxane) terpolymer, (3-5% vinylmethylsiloxane)-(35-40% phenylmethylsiloxane)-(dimethylsiloxane) terpolymer, vinylmethoxysiloxane homopolymer, vinylethoxysiloxane homopolymer, vinylethoxysiloxane-propylethoxysiloxane copolymer, etc., or combinations thereof.

Presently preferred as a termini-functional chemical is a vinyl-terminated siloxane, such as vinyl-terminated polydimethyl siloxane (VTMS), because the other ingredient is also a siloxane. Other vinyl unsaturated siloxanes or silicones are available from Power Chemical Corporation Limited in Korea (http://www.PCC.asia). VTMS is commercially available from Gelest Inc. and shown below.

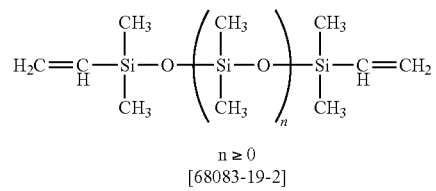

n ≥ 0
[68083-19-2]

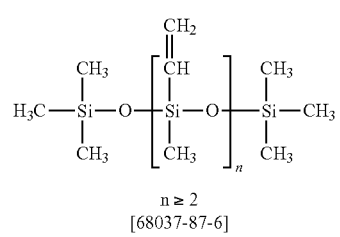

n ≥ 2
[68037-87-6]

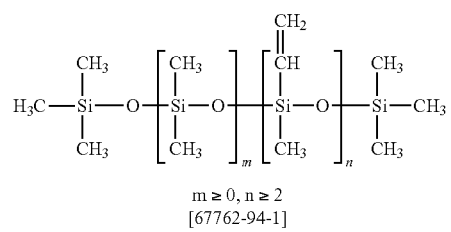

m ≥ 0, n ≥ 2
[67762-94-1]

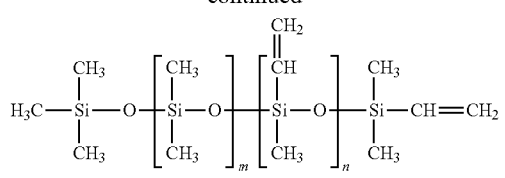
m ≥ 0, n ≥ 1
[68951-99-5]
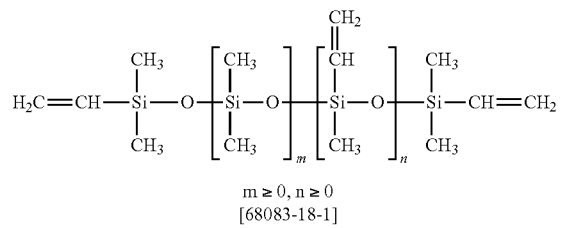
m ≥ 0, n ≥ 0
[68083-18-1]
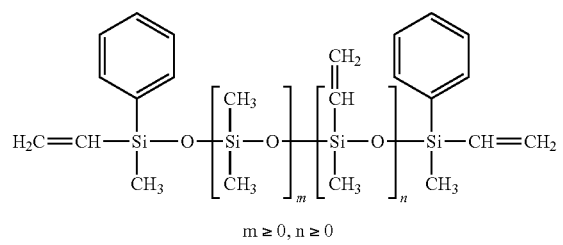
m ≥ 0, n ≥ 0
[no CAS number]
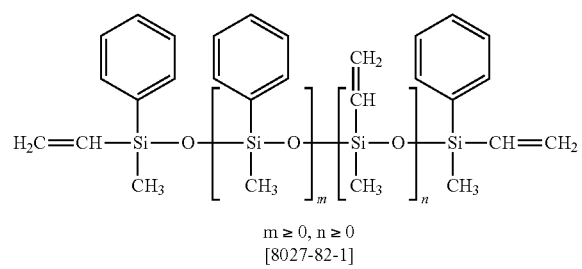
m ≥ 0, n ≥ 0
[8027-82-1]
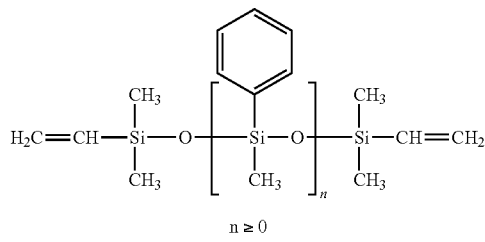
n ≥ 0
[225927-21-9]
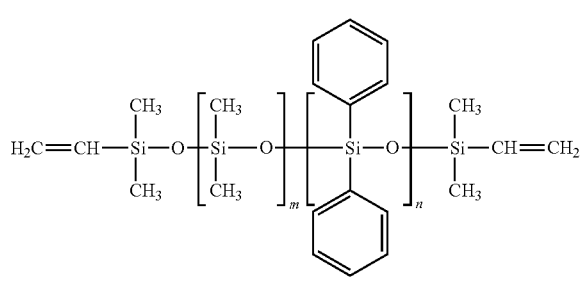
m ≥ 0, n ≥ 0
[68951-96-2]
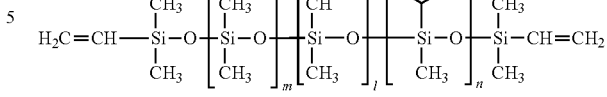
l ≥ 0, m ≥ 0, n ≥ 0
[no CAS number]
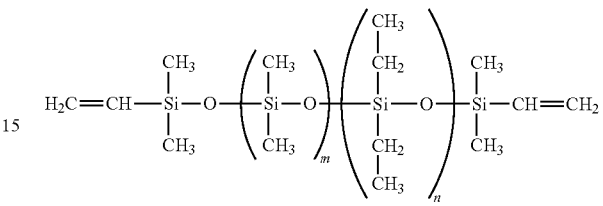
m ≥ 0, n ≥ 0
[no CAS number]
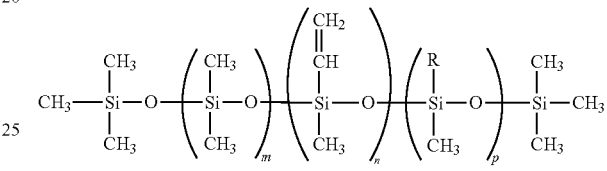
m ≥ 0, n ≥ 0, p ≥ 0
[no CAS number]
n ≥ 1
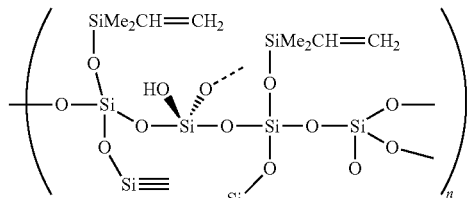
n ≥ 1
[68584-83-8]
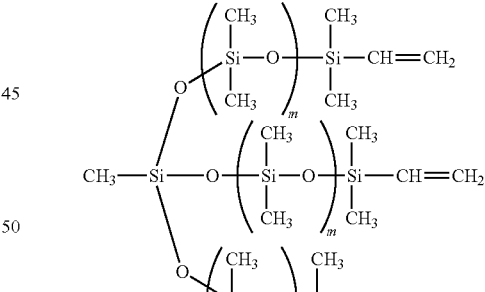
m ≥ 0
[no CAS number]
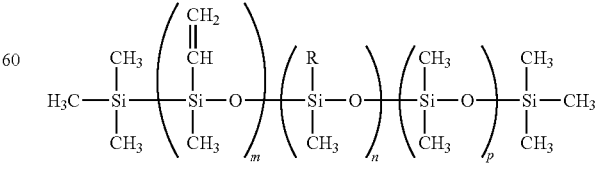
m ≥ 2, n ≥ 0 and p ≥ 0
[no CAS number]

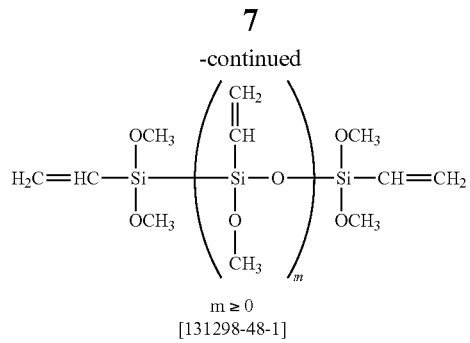

m ≥ 0
[131298-48-1]

Hydride-Functional Polysiloxane

The second ingredient to form the in-situ reaction product, also known as an adduct, is a hydride-functional polysiloxane, especially a homopolymer or copolymer of methyl hydrosiloxane moieties, and/or hydride terminated poly-disubstituted siloxanes, which can contain phenyl and other alkyl substitution on the silicon. Non-limiting examples of such hydride-functional polysiloxane are poly(methyl hydrosiloxane) homopolymer and methylhydrosiloxane-dimethylsiloxane copolymer, in which the percentage of methylhydrosiloxane and/or hydride terminal poly-dimethyl siloxane moieties can range from about 1 to about 99 weight percent and preferably from about 5 to about 99 weight percent. Commercially available copolymers include a 7-8% copolymer. As higher concentration methylhydrosiloxane copolymers, and hydride terminated poly-dimethylsiloxanes might become commercially available, they will be desirable for use in this invention. The homopolymer and copolymer are also commercially available from Gelest Inc.

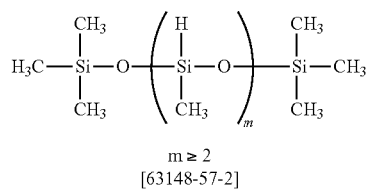

m ≥ 2
[63148-57-2]

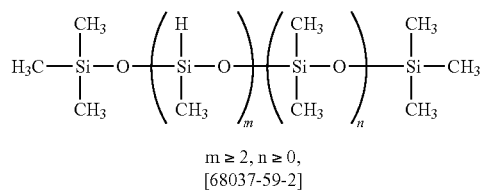

m ≥ 2, n ≥ 0,
[68037-59-2]

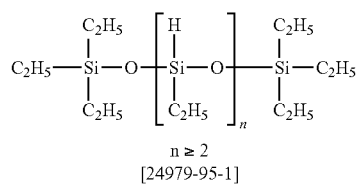

n ≥ 2
[24979-95-1]

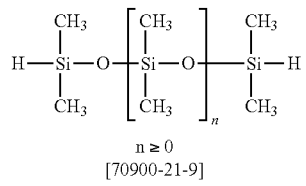

n ≥ 0
[70900-21-9]

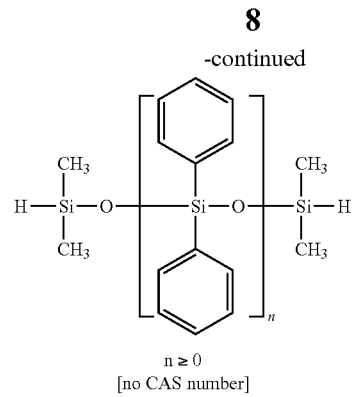

n ≥ 0
[no CAS number]

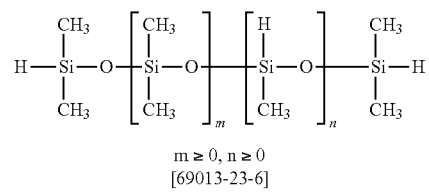

m ≥ 0, n ≥ 0
[69013-23-6]

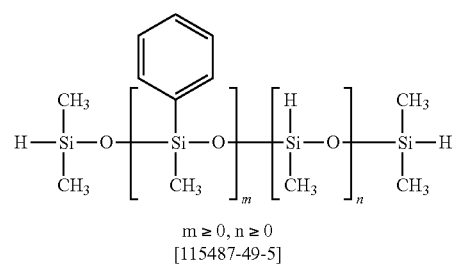

m ≥ 0, n ≥ 0
[115487-49-5]

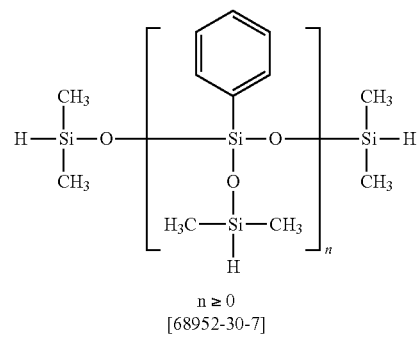

n ≥ 0
[68952-30-7]

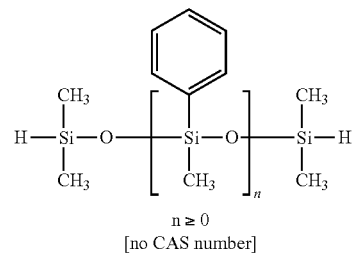

n ≥ 0
[no CAS number]

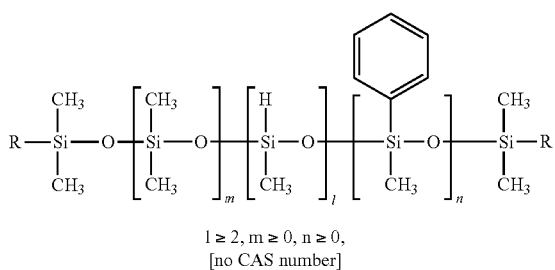

l ≥ 2, m ≥ 0, n ≥ 0,
[no CAS number]

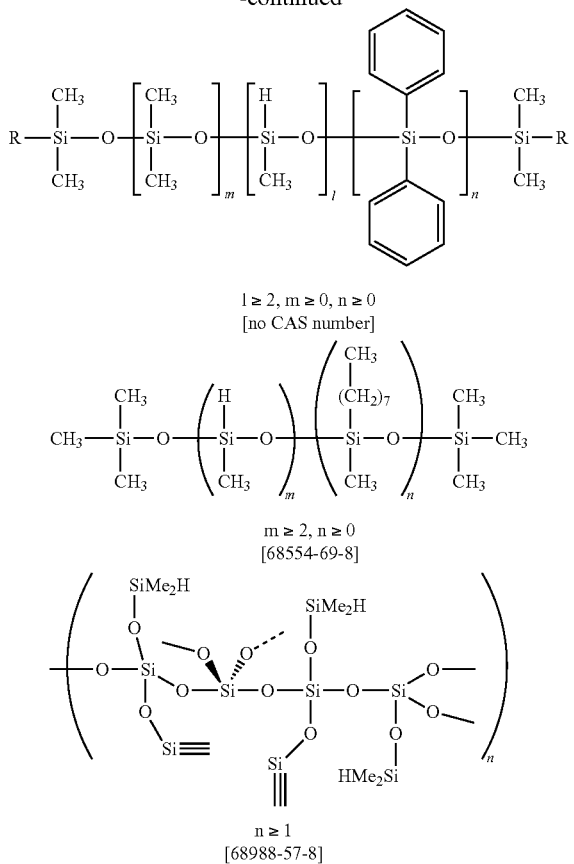

The adduct is formed by an in-situ hydrosilylation reaction and is believed to react between the unsaturated termini of the termini-functional chemical and the hydride (Si—H) functionality resident on the methylhydrosiloxane homopolymer or copolymer. Because the unsaturated termini of the termini-functional chemical are capable of multiple reactions, the termini-functional chemical becomes a crosslinking agent for adjacent methylhydrosiloxane polymers. Without being limited to a particular theory, drip suppression is achieved in compounds of the invention because the resulting crosslinked methylhydrosiloxanes are both non-flammable and networked within the polycarbonate resin upon exposure to sufficient temperatures to begin the crosslinking reaction. One embodiment of the adduct has the structure shown below, where m, and n are the same ranges as identified above.

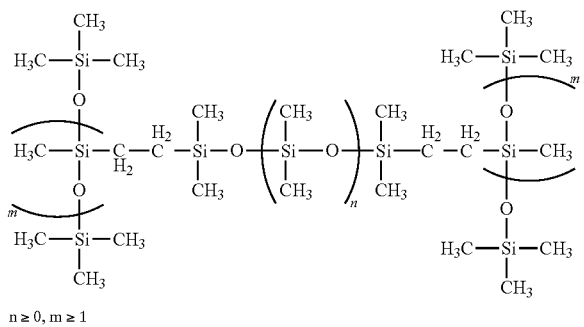

The reaction of the termini-functional chemical and the methylhydrosiloxane polymer should be catalyzed. For that purpose, a catalyst such as a platinum carbonyl complex (also from Gelest Inc.) can be used, preferably with a platinum content of about 1-2.5 weight-percent. Other organo-metallics can be used as hydrosilylation catalysts such as Mn, Fe, V, Zr, Zn, Cu, Ti, and others which have been recently disclosed in PCT Patent Publications WO2013043912A2, WO2013043874A2, etc.

Char Former

Flame retardant thermoplastic compounds can benefit from the presence of char formers, chemicals which assist in the retention of the original shape of the plastic article by the formation of char from the compound. The char forms a crust of non-flammable material, reducing the melting and dripping of the compound in which the char former resides.

One well known char former is perfluorobutane sulfonic acid, potassium salt commercially available as Bayowet C4 MB masterbatch (6% salt (CAS No. 029420-49-3) in polycarbonate pellets) or Bayowet C4 powder (CAS No. 029420-49-3) from Lanxess Deutschland GmbH. However, it is a fluorinated material and can only serve in this invention as a placeholder in the Examples until other aspects of the invention are established.

Any non-halogenated material known to generate a char or crust in the presence of sufficient heat is a candidate for use as a char former in this invention. Non-limiting examples of such materials include diphenylmethane-4-sulfonic acid, calcium salt, inorganic salt of 4-nitro-beta-styrene sulfonate; a more complete listing can be found in U.S. Pat. Nos. 3,931,100 and 3,933,734 and others of Victor Mark, and, preferably, 3-phenylsulfonylbenzenesulfonic acid potassium salt, also known as potassium 3-(phenylsulfonyl)benzenesulfonate and having CAS No. 63316-43-8 and a structure as shown:

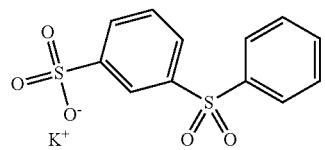 [SMILES: O=S(=O)([O-])c1cccc(S(=O)(=O)c2ccccc2)c1 ; [K+]]

Potassium 3-(phenylsulfonyl)benzenesulfonate is commercially available from a number of suppliers, including OM Group.

Optional Non-Halogenated Flame Retardants

Depending on the type of end use, it is possible that additional flame retardants might be useful in the compound. Four optional types of flame retardants are mentioned. Others known to those persons skilled in the art are also suitable candidates for use with this invention.

Bisphosphate Esters

Bisphosphate esters can be optional ingredients for use in this invention as additional flame retardant ingredients because they contain no halogen atom, which characterizes them as non-halogenated. One reason for using non-halogenated bisphosphate esters is that they are more economical as compared with other non-halogenated phosphorus-containing flame retardants.

Bisphosphate esters are commercially available and known as non-halogenated flame retardants. Specific examples of commercially available bisphosphate esters have the following structures and CAS Numbers:

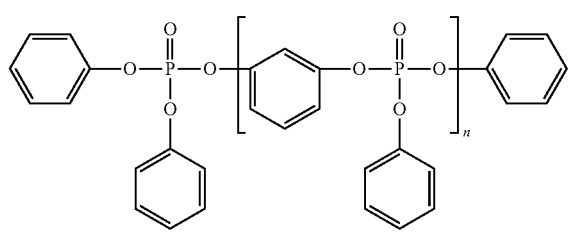

[57583-54-7]
n ≥ 1

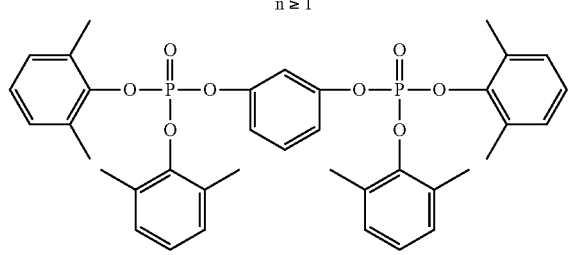

[139189-30-3]

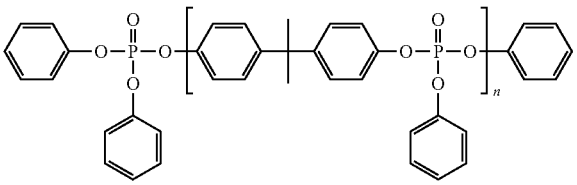

[181028-79-5]
n ≥ 1

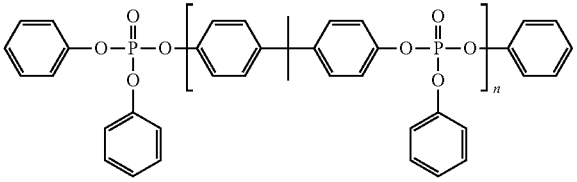

[181028-79-5]
n (average) < 1.1

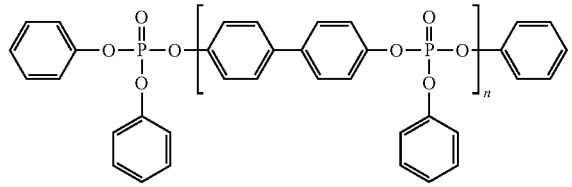

1003300-73-9
n ≥ 1

The foregoing examples of the non-halogenated bisphosphate esters can be used either alone or in combination. Of those examples listed above, all are pale yellow liquids except the second one, CAS No. 139189-30-3 and the last one, CAS No. 1003300-73-9, which are white granules. Granules are preferred for melt compounding because of easier solid material handling and processing. But liquid-based bisphosphate esters can also be used in the invention if suitable liquid material handling equipment such as dosing equipment is available for batch or continuous melt mixing with the polycarbonate and other solid ingredients.

Commercially available bisphosphate esters can be purchased from Adeka Palmarole of Saint Louis, France or Zhejiang Wangsheng Co., Ltd of Linhai City, Zhejiang Province, China. Presently preferred is WSFR-PX220 bisphosphate ester from Zhejiang Wangsheng Co. Ltd, because it is a white solid in granule form and has a melting point greater than 90° C.; a water content of less than 0.1 weight percent; and good compatibility with polycarbonate.

Polyphosphonates

Polyphosphonates used in this invention are polymer compounds containing repeating monomer units of $CH_3$—$PO(OH)_2$; $CH_3$—$PO(OH)$—$OR$, where R represents alkyl or aryl groups; or $R^1O$—$PO(R^3)$—$OR^2$, where $R^1$ and $R^2$ are aromatic or aliphatic and $R^3$ represents alkyl $C_1$-$C_6$ or aromatic. Polyphosphonates can be linear or branched. Preferred are polyphosphonate homopolymers having a polyphosphorous content of greater than about 8 weight percent, a glass transition temperature of at least about 100° C., and a limiting oxygen index of about 50% or higher. Polyphosphonate homopolymers for this invention have a high molecular weight represented by about 10,000 g/mol or higher; and preferably about 20,000 g/mol or higher. Oligomers can also be used with a molecular weight greater than 800 g/mol.

Alternatively, polyphosphonate-co-carbonate polymers can be used, which have an average molecular weight ranging from about 30,000 to about 50,000; a glass transition temperature ranging from about 120° C. to about 133° C.; a percentage phosphorus content of about 3.8 to about 6.5 weight percent of the polyphosphonate-co-carbonate; and a Limiting Oxygen Index ranging from about 40% to about 50%. If the copolymer is used, the amount of polycarbonate resin for the matrix is concomitantly reduced.

FRX Polymers, Inc. of Chelmsford, Mass., USA manufactures flame retardant polyphosphonates, including polyphosphonate homopolymers, such as Nofia™ HM1100 and polyphosphonate-co-carbonate polymers, for example Nofia™ C06000, and oligomers, such as Nofia™ OL1001 Nofia™ OL3001, Nofia™ 3000 and Nofia™ 5000 and others as may identified at the FRX Polymers, Inc. website (frxpolymers.com) from time to time.

Polyphosphazene

In the event that another type of non-halogenated flame retardant is desired, one can include polyphosphazene flame retardants in the thermoplastic compounds of the invention because polyphosphazene flame retardants have excellent hydrolytic stability, better than bisphosphate esters, for example.

U.S. Pat. No. 6,518,336 (Yabuhara et al.) and U.S. Pat. No. 6,743,841 (Shimizu et al.), both of which are incorporated by reference herein, disclose non-halogenated polyphosphazenes which are candidates for use in this invention. Briefly, U.S. Pat. No. 6,518,336 discloses four types of polyphosphazenes.

(1) Cyclic polyphosphazenes represented by the Formula (1)

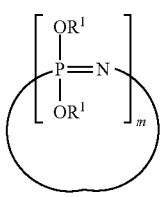

(I)

wherein m is an integer of 3 to 25, two $R^1$ groups are the same or different and each represents a phenyl group substituted with at least one group selected from the class consisting of alkyl groups having 1 to 6 carbon atoms and an allyl group or an unsubstituted phenyl group, or a hydroxy substituted phenyl.

(2) Straight-chain polyphosphazenes represented by the Formula (2)

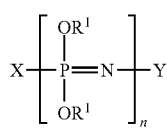

(2)

wherein n is an integer of 3 to 1000, $R^1$ is as defined above, X represents a group $-N=P(OR^1)_3$ or a group $-N=P(O)OR^1$, and Y represents a group $-P(OR^1)_4$ or a group $-P(O)(OR^1)_2$.

(3) Crosslinked polyphosphazenes wherein at least one of the foregoing phosphazenes (1) and (2) is crosslinked with at least one crosslinking group selected from the group consisting of o-phenylene, m-phenylene, p-phenylene, biphenylene, and a group represented by

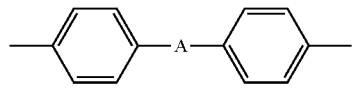

wherein A is a group $-SO_2-$, a group $-S-$, a group $-O-$ or a group $-C(CH_3)_2-$, each of said crosslinking groups being interposed between the two oxygen atoms left after the elimination of group $R^1$ from the phosphazene (1) or (2), and the number of the $R^1$ groups in the crosslinked phosphazene being 50 to 99.9% based on the total number of $R^1$ groups in the phosphazene prior to the crosslinking.

(4) At least one polyphosphazene selected from the group consisting of cyclic polyphosphazenes represented by formula (3)

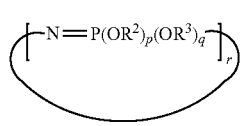

(3)

wherein $R^2$ is a cyano-substituted phenyl group; $R^3$ is an alkyl group having 1 to 18 carbon atoms or an aryl group having 6 to 10 carbon atoms; these groups may be substituted with at least one group selected from alkyl groups having 1 to 10 carbon atoms, allyl group and aryl groups; when two or more $R^3$ groups exist, the $R^3$ groups may be the same or different; p and q are numbers which fulfill the requirements that p>0, q·0, and p+q=2; r is an integer of 3 to 25, and a straight-chain polyphosphazene represented by the formula (4)

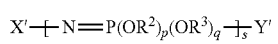

(4)

wherein $R^2$, $R^3$, p and q are as defined above; s is an integer of 3 to 1000; X' is a group $-P(OR)_4$, a group $-P(OR^2)_3(OR^3)$, a group $P(OR^2)_2(OR^3)_2$, a group $-P(OR^2)(OR^3)_3$, a group $-P(OR^3)_4$, a group $P(O)(OR^2)_2$, a group $-P(O)(OR^2)(OR^3)$, or a group $-P(O)(OR^3)_2$; and Y' is a group $-N=P(OR^2)_3$, a group $-N=P(OR^2)_2(OR^3)$, a group $N=P(OR^2)(OR^3)_2$, a group $-N=P(OR^3)_3$, a group $-N=P(O)OR^2$ or a group $N=P(O)OR^3$.

The foregoing examples of the non-halogenated polyphosphazenes can be used either alone or in combination.

Specific examples of the cyclic polyphosphazene (1) and the straight-chain polyphosphazene (2) include a mixture of phosphazenes in which phenoxy groups and/or alkoxy groups are introduced as substituents and which are obtainable from a mixture of cyclic and straight-chain chlorophosphazenes, e.g., hexachlorocyclotriphosphazene, octachlorocyclotetra-phosphazene and the like, prepared by reacting ammonium chloride and phosphorus pentachloride at about 120 to about 130° C.; and hexaphenoxycyclotriphosphazene, octaphenoxycyclotetraphosphazene, decaphenoxycyclo-pentaphosphazene, hexaalkoxycyclotriphosphazene, octaalkoxycyclotetraphosphazene, decaalkoxycyclopentaphosphazene and like cyclic phosphazenes obtained by isolating, from the above mixture of chlorophosphazenes, hexachlorocyclotriphosphazene, octachlorocyclotetraphosphazene, decachlorocyclopenta-phosphazene or like single substances, followed by substitution with a phenoxy group and/or an alkoxy group.

Specific examples of the straight-chain polyphosphazenes (2) include those obtained by heating (at 220 to 250° C.) hexachlorocyclotriphosphazene for ring-opening polymerization to give dichlorophosphazene, followed by substitution with a phenoxy group and/or an alkoxy group.

Specific examples of the crosslinked polyphosphazenes (3) are phenoxyphosphazene having 4,4'-sulfonyldiphenylene(bisphenol-S residue) group-crosslinked structure, phenoxyphosphazene having 2,2-(4,4'-diphenylene)isopropylidene group-crosslinked structure, phenoxyphosphazene having 4,4'-oxydiphenylene group-crosslinked structure, phenoxyphoshazene having 4,4'-thiodiphenylene group-crosslinked structure, phenoxyphosphazene having 4,4'-diphenylene group-crosslinked structure, etc.

Specific examples of the polyphosphazenes (4) are monocyanophenoxypentaphenoxycyclotriphosphazene, dicyanophenoxytetraphenoxycyclotriphosphazene, tricyanophenoxytriphenoxycyclotriphosphazene, tetracyanophenoxydiphenoxycyclotriphosphazene, pentacyanophenoxymonophenoxycyclotriphosphazene and like cyclotriphosphazene compounds; monocyanophenoxyhepta-phenoxycyclotetraphosphazene, dicyanophenoxyhexaphenoxycyclotetraphosphazene, tricyanophenoxypentaphenoxy-cyclotetraphosphazene, tetracyanophenoxytetraphenoxy-cyclotetraphosphazene, pentacyanophenoxytriphenoxycyclotetraphosphazene, hexacyanophenoxydiphenoxy-cyclotetraphosphazene, heptacyanophenoxymonophenoxy-cyclotetraphosphazene and like cyclotetraphosphazenes; cyclopentaphosphazenes having both cyanophenoxy and phenoxy groups as substituents; and like cyclic phosphazenes; and straight-chain phosphazenes having both cyanophenoxy and phenoxy groups as substituents.

Among these polymers, preferred are a mixture of polyphenoxyphosphazenes which have phenoxy groups as substituents and which are obtainable from a mixture of cyclic and straight-chain chlorophosphazenes, phenoxyphosphazene having 4,4'-sulfonyldiphenylene-crosslinked structure; phenoxyphosphazene having 2,2-(4,4'-diphenylene)-isopropylidene group-crosslinked structure; and polyphosphazenes having both cyanophenoxy and phenoxy groups as substituents.

Commercially available polyphosphazenes can be purchased from Otsuka Chemical Co., Ltd. of Osaka, Japan. Presently preferred as an optional second flame retardant is SPB 100 polyphosphazene from Otsuka.

Polyphosphonates

Any polyphosphonate as disclosed in U.S. Pat. No. 7,645,850 (Freitag) to make the polyphosphonate-co-carbonate is also useful in this invention. More recently, branched polyphosphonates as disclosed in United States Patent Application Publication US20070032633 (Freitag et al.), incorporated by reference herein, have been disclosed and are useful.

Other Non-Halogenated Flame Retardants

A variety of other flame retardants are also candidates, including without limitation; Diethyl N,N bis(2-hydroxyethyl)aminomethylphosphonate (CAS No. 2781-11-5); Oligomeric ethyl ethylene phosphate (CAS No. 184538-58-7); Bisphenol A bis(diphenyl phosphate) (CAS No. 5945-33-5); Resorcinol bis(diphenyl phosphate) (CAS No. 125997-21-9), all marketed under the Fyrol™ or Fyrolflex™ brands by ICL. Preferably, poly-(m-phenylene methylphosphonate) (CAS No. 63747-58-0) marketed as Fyrol™ PMP is useful.

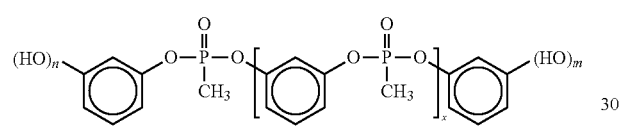

m,n = 0 or 1
x > 6

Other candidates are fusible zinc phosphinates as disclosed in United States Patent Application Publication US20040176506 (Burghardt et al.); 9,10-dihydro-9-oxa-10-phosphaphenanthrene-10-oxide (DOPO, CAS: 35948-25-5), and DOPO derivatives such as the DOPO-maleic anhydride adduct and the DOPO-benzoquinone adduct (10-(2,5-dihydroxyphenyl)-10H-9-oxa-10-phospha-phenantbrene-10-oxide, DOPO-HQ, CAS: 99208-50-1), DOPO/itaconic acid adduct, Ukanol FR 50®, Struktol® VP 3780 and Struktol® VP 3701 commercially available from Schill and Seilacher of Germany, other DOPO derivatives can be found in U. S. Patent Application Publication 2012/0095140 A1 and U.S. Pat. No. 8,101,678 B2. 2-carboxyethyl(methyl)phosphinic acid, and 2-carboxyethyl(phenyl)phosphinic acid

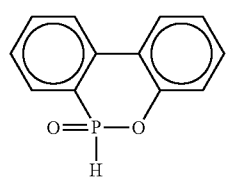

DOPO

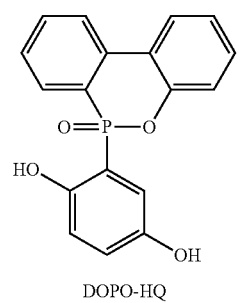

DOPO-HQ

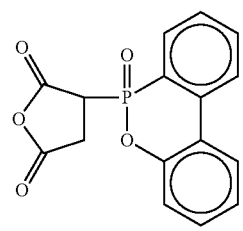

DOPO-maleic anhydride adduct

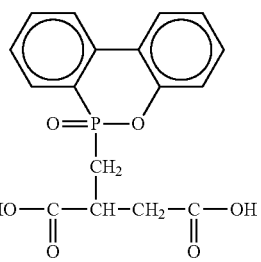

DOPO/itaconic acid adduct

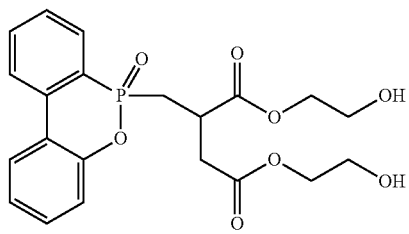

Ukanol FR 50®

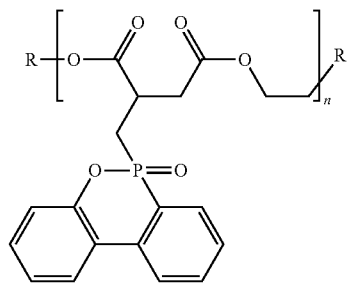

n ≥ 1
Struktol® VP 3780

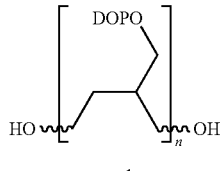

n ≥ 1
Struktol® VP 3701

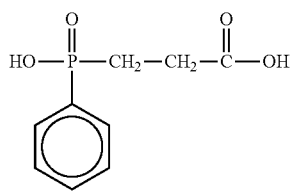

2-carboxyethyl(phenyl)phosphinic acid

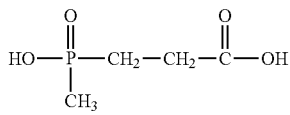

2-carboxyethyl(methyl)phosphinic acid and bisphosphoramidates as disclosed in U.S. Pat. No. 5,973,041 (Campbell et al.) as shown below

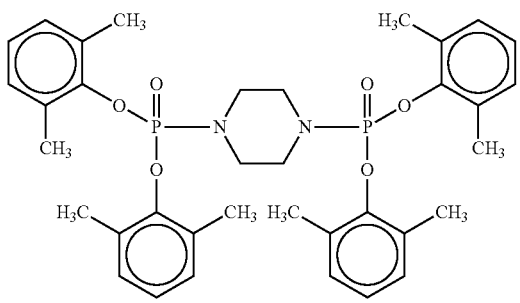

Optional Talc

Talc is used often in thermoplastic compounds as a mineral filler. In flame retardant thermoplastic compounds, talc can also assist in flame retardance by being a barrier to oxygen and increasing viscosity of the molten polymer matrix during combustion.

Talc can have a particle size ranging about 0.5 µm to about 10 µm and preferably from about 0.5 µm to about 0.9 µm.

Talc is commercially available from a number of manufacturers. Presently preferred is Ultra Talc 609 from Specialty Minerals Company, which has a particle size of from about 0.5 µm to about 0.9 µm.

Optional Other Additives

The compound of the present invention can include conventional plastics additives in an amount that is sufficient to obtain a desired processing or performance property for the compound. The amount should not be wasteful of the additive nor detrimental to the processing or performance of the compound. The additive cannot contain halogenated materials. Those skilled in the art of thermoplastics compounding, without undue experimentation but with reference to such treatises as *Plastics Additives Database* (2004) from Plastics Design Library (elsevier.com website), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppressants; impact modifiers; initiators; lubricants; micas; pigments, colorants and dyes; plasticizers, such as core/shell impact modifiers; processing aids; release agents; silanes, titanates and zirconates; slip and anti-blocking agents; stabilizers; stearates; ultraviolet light absorbers; viscosity regulators; waxes; catalyst deactivators, scavengers and combinations of them.

Ingredients

Table 1 shows the acceptable, desirable, and preferred amounts of each of the ingredients discussed above, recognizing that the optional ingredients need not be present at all. The compound can comprise the ingredients, consist essentially of the ingredients, or consist of the ingredients. All amounts are expressed in weight percent of the total compound.

All ingredients other than the polycarbonate matrix can be added individually to the matrix or any two or more of them can be added together.

TABLE 1

| Range of Ingredients (Weight Percent) | | | |
|---|---|---|---|
| | Acceptable | Desirable | Preferable |
| Polycarbonate Matrix | 98.9-63 | 97.89-72 | 95.78-79.2 |
| Termini-functional chemical | 1-5 | 1-4 | 1-3 |
| Hydride-functional Polysiloxane (Methylhydrosiloxane Homopolymer or Copolymer) | 1-5 | 1-4 | 1-3 |
| Platinum Catalyst Complex (1-2.5% Platinum) | 0-1 | 0.01-0.5 | 0.01-0.3 |
| Non-Halogenated Char Former | 0.1-2 | 0.1-1.5 | 0.1-0.5 |
| Talc | 0-9 | 0-5 | 0-2 |
| Optional Non-Halogenated Flame Retardant | 0-10 | 0-10 | 0-10 |
| Optional Other Additives | 0-5 | 0-3 | 0-2 |

Processing

The preparation of compounds of the present invention, and masterbatches for them, is uncomplicated. The compound can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 350 to about 450 rpm. Typically, the output from the extruder is pelletized for later extrusion, molding, thermoforming, calendering, or additive manufacturing (3D printing) into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com website), one can make articles of any conceivable shape and appearance using compounds of the present invention.

USEFULNESS OF THE INVENTION

Thermoplastic compounds can be shaped by extrusion, molding, calendering, thermoforming, 3D printing, or other means of shaping into any plastic article usable in an interior or confined space where fire can cause personal injury or property damage. The compounds resist both melting and dripping.

Literally any plastic article useful in a human-occupied space such as a building, a vehicle, or a tunnel can benefit from the flame retardancy and drip suppression of this polycarbonate compound.

Because the physical properties of polycarbonate compounds are known, which are believed to not be deleteriously affected by the addition of the drip suppressants and char former, any plastic article which is currently made from a polycarbonate compound can now be made from the completely non-halogenated flame retardant compound of this invention.

Polycarbonate itself has superior flame retardant properties when compared to other polymer resins, such as polyolefins. The inherent flame retardant properties of polycarbonate assisted in achieving the UL 94 V-0 rating after the addition of the non-halogenated drip suppressant ingredients and the non-halogenated char former.

By achieving a UL 94 V-0 rating at a thickness as thin as 3.2 mm, it is known that a plastic article having any larger thickness will also achieve a UL 94 V-0 rating.

Thermoplastic articles are sold into the following markets: appliance, building and construction, consumer, electrical and electronic, healthcare, industrial, packaging, textiles, transportation, and wire and cable. Compounds of this invention can be used in any of those markets regardless of thickness above 3.2 mm, the thickness of four United States dime ($0.10) coins.

As stated repeatedly, Underwriters' Laboratories Test No. UL 94 serves as the litmus test for flame retardant thermoplastic compounds. As seen in Table 2, the V-0 rating is distinguished from V-1 and V-2 ratings, which are less acceptable if one is seeking the best flame retardance rating. For certain uses, V-1 is acceptable.

But for this invention, the focus of the invention is on the dripping of molten polymer, and the successful Examples will be determined by whether the cotton indicator is ignited or any dripping occurs on to the cotton indicator by a compound completely non-halogenated. Because optional non-halogenated flame retardants can be added, the determination of V-0 is less significant for this aspect of the present invention, although further embodiments would address the need for V-0 performance.

TABLE 2

| Criteria Conditions | V-0 | V-1 | V-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |
| Afterflame or afterglow of any specimen up to the holding clamp | No | No | No |
| Cotton indicator ignited by flaming particles or drops | No | No | Yes |

Examples provide data for evaluation of the unpredictability of this invention.

EXAMPLES

Table 3 shows the ingredients chosen for Examples 1-5 and Comparative Examples A-Y.

TABLE 3

| Brand | Chemical | Purpose | Source |
|---|---|---|---|
| Makrolon ® PC 2658 Pellet | Polycarbonate (12 g/ 10 min. melt flow index) ASTM 1238 | Matrix | Bayer Material-Science |
| Nofia ™ CO3500 | poly(phosphonate-co-carbonate) | Matrix | FRX Polymers |
| B225 | Irganox ® B225 | Heat and light stabilizer | Ciba |
| TEFLON ® 6C | Polytetrafluoroethylene | Anti-dripping agent | DuPont |
| DMS-V35 | Vinyl terminated Polydimethylsiloxane | Non-Halogen anti-dripping component | Gelest Inc |
| HMS-993 | Poly(methyl hydrosiloxane) | Non-Halogen anti-dripping component | Gelest Inc |
| HMS-082 | 7-8% methylhydrosiloxane-dimethylsiloxane copolymer | Non-Halogen anti-dripping component | Gelest Inc |
| | Platinum Carbonyl Complex (1.85-2.1% platinum) | Catalyst | Gelest Inc |
| Bayowet ® C4 MB (6%) | 1,1,2,2,3,3,4,4,4-Nonafluoro-1-butanesulfonic acid potassium salt | Char Former | Lanxess |
| KSS* (5%) | Potassium 3-(phenylsulfonyl)benzene sulfonate | Non-Halogen Char Former | OM Group |
| Metablen ™ S-2030 | a silicone/acrylic rubber based impact modifier | Impact modifier | Mitsubishi Rayon America Inc |

*Masterbatch of 5% of potassium 3-(phenylsulfonyl)benzenesulfonate in polycarbonate resin, was made by the same extrusion conditions as for the Examples described in the next two paragraphs.

All Examples were mixed in a Prism TSE 16 mm twin screw extruder (L/D=40) twin screw extruder with all raw materials fed at the throat at Barrel 1. The temperature in all zones was set at 300°, except for Comparative Example X which was not extruded and Comparative Example Y, Z, AA, and Examples 4, 5, 6, and 7 which used a temperature of 260° C. The extruder screw rotated at 350 rpm, except for Comparative Example Y, Z, AA and Examples 4, 5, 6, and 7 which used a speed of 400 rpm. The extrudate was pelletized, cooled on the belt, for later injection or compression molding.

Before molding, the pellets were dried for more than 16 hours at 80° C. to reduce moisture content to less than 0.02%.

Using a DeMag or Nissei molding machine, Table 4 shows the settings used to mold test bars of each Example and Comparative Example having a thickness of 3.175 mm.

TABLE 4

Molding Conditions

| | Molding machines | |
|---|---|---|
| | 88 Nissei | 120T Demag |
| | Examples | |
| | 1-3 and G-W | A-F, 4, 5, 6, 7, X, Y, Z and AA |

Drying Conditions before Molding:

| | | |
|---|---|---|
| Temperature (° C.) | 80 | 80 |
| Time (h) | 16 | 12 |

Temperatures:

| | | |
|---|---|---|
| Nozzle (° C.) | 277 | 257 |
| Zone 1 (° C.) | 282 | 252 |
| Zone 2 (° C.) | 277 | 246 |
| Zone 3 (° C.) | 277 | 241 |
| Mold (° C.) | 82 | 66 |
| Oil Temp (° C.) | 31 | 31 |

Speeds:

| | | |
|---|---|---|
| Screw RPM | 65% | 100% |
| Inj Vel Stg 1 | 30% | 0.5 (in/sec) |
| Inj Vel Stg 2 | 20% | 0.5 (in/sec) |
| Inj Vel Stg 3 | 20% | 0.5 (in/sec) |
| Inj Vel Stg 4 | 20% | 0.5 (in/sec) |
| Inj Vel Stg 5 | 20% | 0.5 (in/sec) |

Pressures:

| | | |
|---|---|---|
| Inj Press Stg-Time (sec) | 7 | N/A |
| Injection Pressure 1 | 90% | 1887 psi |
| Hold Pressure 2 | 20% | 800 psi |
| Hold Pressure 3 | 0 | N/A |
| Back Pressure | 5% | 25 psi |

Timers:

| | | |
|---|---|---|
| Injection Hold (sec) | 4 | 4 |
| Cooling Time (sec) | 15-20 | 10 |

Operation Settings:

| | | |
|---|---|---|
| Shot Size (mm) | 2.4-2.7 | 2.0 |
| Cushion (mm) | 0.5-0.6 | 0.5 |

Table 5 shows the flame performance tested for Examples 1-3 and Comparative Examples A-W.

TABLE 5

| | Example | | | | | |
|---|---|---|---|---|---|---|
| | A | B | C | D | E* | F* |
| Makrolon ® PC 2658 | 99.00 | 98.50 | 91.50 | 91.50 | | |
| B225 stabilizer | 0.10 | 0.10 | 0.10 | 0.10 | | |
| DuPont TEFLON ® 6C | | 0.50 | | | | |
| Vinyl terminated Polydimethylsiloxanes DMS-V35 | | | 3.00 | 3.00 | | |
| Poly(methyl hydrosiloxane) HMS-993 | | | 4.50 | | | |
| 7-8% methylhydrosiloxane-dimethylsiloxane copolymer HMS-082 | | | | 4.50 | | |
| Platinum Carbonyl Complex (1.85-2.1% platinum) | | | | | 0.02 | 0.02 |
| Bayowet ® C4 Masterbatch (6%) | 0.90 | 0.90 | 0.90 | 0.90 | | |
| Comparative Example C | | | | | 99.98 | |
| Comparative Example D | | | | | | 99.98 |
| Total | 100.00 | 100.00 | 100.00 | 100.00 | 100.00 | 100.00 |
| Molded bar thickness | 1/8" | 1/8" | | | 1/8" | 1/8" |
| Dripped/Ignited cotton | Y | N | | | N | N |
| UL rating | V-2 | V-0 | | | V-0 | No rating |

| | Example | | | | | | | | | | |
|---|---|---|---|---|---|---|---|---|---|---|---|
| | G* | H* | I* | J* | K* | L* | M* | N* | O* | P* | Q* | R* |
| Makrolon ® PC 2658 | 94.16 | 92.96 | 93.54 | 94.68 | 95.25 | 95.69 | 91.75 | 94.92 | 96.61 | 94.22 | 93.40 | 94.22 |
| B225 stabilizer | 0.10 | 0.10 | 0.10 | 0.10 | 0.10 | 0.10 | 0.10 | 0.10 | 0.10 | 0.10 | 0.10 | 0.10 |
| Vinyl terminated Polydimethylsiloxane DMS-V35 | 1.04 | 2.27 | 3.00 | 3.00 | 1.00 | 2.21 | 2.65 | 2.05 | 1.00 | 1.78 | 1.00 | 1.78 |
| Poly(methyl hydrosiloxane) HMS-993 | 3.70 | 3.67 | 2.36 | 1.22 | 2.65 | 1.00 | 4.50 | 1.93 | 1.29 | 2.90 | 4.50 | 2.90 |

TABLE 5-continued

| | | | | | | | | | | | | |
|---|---|---|---|---|---|---|---|---|---|---|---|---|
| Platinum Carbonyl Complex (1.85-2.1% platinum) | 0.10 | 0.10 | 0.10 | 0.10 | 0.10 | 0.10 | 0.10 | 0.10 | 0.10 | 0.10 | 0.10 | 0.10 |
| Bayowet ® C4 Masterbatch (6%) | 0.90 | 0.90 | 0.90 | 0.90 | 0.90 | 0.90 | 0.90 | 0.90 | 0.90 | 0.90 | 0.90 | 0.90 |
| Total | 100.00 | 100.00 | 100.00 | 100.00 | 100.00 | 100.00 | 100.00 | 100.00 | 100.00 | 100.00 | 100.00 | 100.00 |
| Flame bars thickness | ⅛" | ⅛" | ⅛" | ⅛" | ⅛" | ⅛" | ⅛" | ⅛" | ⅛" | ⅛" | ⅛" | ⅛" |
| Dripped/Ignited cotton | N | N | N | N | N | N | N | N | N | N | N | N |
| UL rating | V-0 | V-0 | V-0 | V-0 | V-0 | V-0 | V-0 | V-0 | V-0 | V-0 | V-0 | V-0 |

| | Example | | | | | | | |
|---|---|---|---|---|---|---|---|---|
| | S | T* | 1 | 2 | 3 | U | V* | W |
| Makrolon ® PC 2658 | 95.90 | 95.40 | 91.58 | 92.59 | 93.51 | 93.97 | 97.07 | 93.74 |
| B225 stabilizer | 0.10 | 0.10 | 0.10 | 0.10 | 0.10 | 0.10 | 0.10 | 0.10 |
| DuPont TEFLON ® 6C | | 0.50 | | | | | | |
| Vinyl terminated Polydimethylsiloxane DMS-V35 | | | 3.00 | 2.21 | 1.00 | 0.80 | 0.80 | 0.9 |
| Poly(methyl hydrosiloxane) HMS-993 | | | 1.22 | 1.00 | 1.29 | 1.03 | 1.03 | 1.16 |
| Platinum Carbonyl Complex (1.85-2.1% platinum) | | | 0.10 | 0.10 | 0.10 | 0.10 | 0.10 | 0.10 |
| Bayowet ® C4 Masterbatch (6%) | | | | | | | 0.90 | |
| KSS master batch (5% potassium 3-(phenylsulfonyl) benzenesulfonate) | 4.00 | 4.00 | 4.00 | 4.00 | 4.00 | 4.00 | | 4.00 |
| Total | 100.00 | 100.00 | 100.00 | 100.00 | 100.00 | 100.00 | 100.00 | 100.00 |
| Flame bars thickness | ⅛" | ⅛" | ⅛" | ⅛" | ⅛" | ⅛" | ⅛" | ⅛" |
| Dripped/Ignited cotton | Y | N | N | N | N | Y | N | Y |
| UL rating | V-2 | V-0 | V-1 | V-1 | V-0 | V-2 | V-0 | V-2 |

There are only three successful Examples of completely non-halogenated polycarbonate compounds which have no dripping or igniting of the cotton indicator. Nonetheless, those Comparative Examples marked with * are useful in reaching the successes of Examples 1-3.

Comparative Example A was the basic control with fluorinated char former but no drip suppressant. Comparative Example B added fluorinated drip suppressant and achieved a successful dripping/igniting result. But Comparative Example B was halogenated.

Comparative Examples C and D were made with non-halogenated termini-functional chemical and non-halogenated methylhydrosiloxane polymer as masterbatches for Comparative Examples E and F which added platinum carbonyl catalyst. All of Comparative Examples C—F used fluorinated char former. Comparative Examples E and F, and their respective Comparative Examples C and D, are instructive of the amount of methylhydrosiloxane moieties necessary. Whether based on the use of 7-8% copolymer or 100% homopolymer, each was a success to avoid dripping or igniting of the cotton indicator. As more grades of copolymer become available commercially, a person having ordinary skill in the art will recognize that there are acceptable amounts of methylhydrosiloxane moieties between 8% and 100% which also will work, whether that amount is 10% or 20% or 30% or 40% or 50% or 60% or 70% or 80% or 90%, or any other number among that range from 8% to 100%.

Comparative Examples G-R are an experimental series which are also instructive to compounds of the invention. In each of these Comparative Examples G-R, the fluorinated char former is used, which prevents the formulations from being acceptable in that regard, but the remainder of the formulations explore various weight percent amounts of the non-halogenated termini-functional chemical and the non-halogenated methylhydrosiloxane homopolymer (100% methylhydrosiloxane moieties), all other ingredients constant (except for the polycarbonate resin which must fluctuate as to the ingredients for non-halogenated drip suppression.) All of Comparative Examples G-R had successful dripping/igniting test results, e.g., flame out times were low and no flaming drips were evident, thus demonstrating that a variety of amounts of in-situ drip suppressant adducts results in a robust polycarbonate compound.

With the knowledge gained from Comparative Examples G-R, Comparative Examples S and T returned to the controls of Comparative Examples A and B, except that the char former was non-halogenated potassium 3-(phenylsulfonyl) benzenesulfonate. Comparative Example S had no drip suppressant, which Comparative Example T had a fluorinated drip suppressant, which showed that the combination of non-halogenated char former could work with a conventional drip suppressant.

Examples 1, 2, and 3 all resulted in no dripping or igniting of the cotton indicator and were formulated with completely non-halogenated ingredients. These formulations are embodiments of the invention, and among them, Example 3 is preferred because the UL rating is V-0 without the addition of any optional non-halogenated flame retardant. Examples 1 and 2 could be considered satisfactory for some uses with a V-1 UL rating, but also, such formulations could have some optional non-halogenated flame retardant added to increase the probabilities to achieve a V-0 UL rating.

Comparative Examples U, V, and W explore where the successes of Examples 1, 2, and 3 are limited. Comparative Examples U and W follow the sequence of Examples 1-3, except that the weight percent of non-halogenated termini-functional chemical decreases below 1 weight percent with resulting dripping/igniting failures. Comparative Example V is the same as Comparative Example U, except that fluorinated char former has replaced non-halogenated char former, albeit in a larger amount. That change allowed Comparative Example V to achieve a successful dripping/igniting cotton indication, making known that the type of char former has an effect on test success or failure for the dripping/igniting component of the UL test protocol.

Finally, Examples 1-3 have their comparables to Comparative Examples J, L, and O, respectively, further supporting the knowledge that generation of in-situ drip suppressants work well with a minimum of 1 weight percent of non-halogenated termini-functional chemical regardless of the halogenations of the char former. Thus, Examples 1-3 and the many Comparative Examples permit a person having ordinary skill in the art, without undue experimentation, to adjust formulations to achieve successful dripping/igniting tests and also strive for a superior V-0 based on Example 3 or variations made to Examples 1 and 2 to add optional non-halogenated flame retardant.

Tables 6 and 7 identify the usefulness of Nofia™ polyphosphonate-co-carbonate in this invention.

TABLE 6

| | Example | | | |
|---|---|---|---|---|
| | X | Y | 4 | 5 |
| Nofia ™ CO3500 | 100.00 | 99.40 | 97.51 | 97.97 |
| B225 | | 0.10 | 0.10 | 0.10 |
| DuPont TEFLON ® 6C | | 0.50 | | |
| Vinyl terminated Polydimethylsiloxane DMS-V35 | | | 1.00 | 0.80 |
| Poly(methyl hydrosiloxane) HMS-993 | | | 1.29 | 1.03 |
| Platinum Carbonyl Complex (1.85-2.1% platinum) | | | 0.10 | 0.10 |
| Total | 100.00 | 100.00 | 100.00 | 100.00 |
| Molded bar thickness | ⅛" | ⅛" | ⅛" | ⅛" |
| Dripped/Ignited cotton | N** | N | N | N |
| UL rating | V-0** | V-0 | V-0 | V-0 |
| Molded bar thickness | 1/16" | 1/16" | 1/16" | 1/16" |
| Dripped/Ignited cotton | Y | N | N | N |
| UL rating | V-2 | V-0 | V-0 | V-0 |

*Did not extrude; directly molded into flame bars.
**Dripping but no ignition

TABLE 7

| | Example | | | |
|---|---|---|---|---|
| | Z | AA | 6 | 7 |
| Nofia ™ CO3500 | 99.90 | 89.90 | 92.51 | 87.51 |
| B225 | 0.10 | 0.10 | 0.10 | 0.10 |
| DuPont TEFLON ® 6C | | | | |
| Vinyl terminated Polydimethylsiloxane DMS-V35 | | | 1.00 | 1.00 |
| Poly(methyl hydrosiloxane) HMS-993 | | | 1.29 | 1.29 |
| Metablen ™ S-2030 | | 10.00 | 5.00 | 10.00 |
| Platinum Carbonyl Complex (1.85-2.1% platinum) | | | 0.10 | 0.10 |
| Total | 100.00 | 100.00 | 100.00 | 100.00 |
| Molded bar thickness | ⅛" | ⅛" | ⅛" | ⅛" |
| Dripped/Ignited cotton | Y | N | N | N |
| UL rating | V-2 | V-0 | V-0 | V-0 |

TABLE 7-continued

| | Example | | | |
|---|---|---|---|---|
| | Z | AA | 6 | 7 |
| Molded bar thickness | 1/16" | 1/16" | 1/16" | 1/16" |
| Dripped/Ignited cotton | Y | Y | N | N |
| UL rating | V-2 | V-2 | V-0 | V-0 |

Comparative Example X using the polyphosphonate-co-carbonate at ⅛ inch molded thickness dripped on to the cotton but did not ignite, as compared with Comparative Example A using polycarbonate, which did ignite. The polyphosphonate-co-carbonate includes the polyphosphonate flame retardant within the molecular structure, offering better initial flame retardance than does polycarbonate alone.

Comparative Example Y used PTFE successfully, but PTFE contains halogen atoms.

Examples 4 and 5 used slightly different amounts of non-halogenated termini-functional chemical and hydride functional siloxane, but both were not only successful with the absence of dripping or ignition, but also were V-0 rated for flame retardance.

Examples 4 and 5 demonstrate that a char former is not required, if the polycarbonate matrix itself contains a non-halogenated moiety with flame retardant properties.

Comparative Example Z was similar to Comparative Example X, except for the addition of the stabilizer. Comparative Example AA introduced an impact modifier to assist in physical performance properties, which appeared to assist in avoiding dripping/igniting at ⅛ inch thickness, but 1/16 thickness. Examples 6 and 7 demonstrated the addition of the termini-functional chemical and the hydride-functional polysiloxane at their appropriate amounts provided a non-halogenated drip suppressant which performed well at both thicknesses with varying amounts of impact modifier.

The invention is not limited to the above embodiments. The claims follow.

What is claimed is:

1. A completely non-halogenated flame retardant polycarbonate compound, comprising:
    (a) from about 91.58 to about 93.51 weight percent, by weight of the compound, of polycarbonate homopolymer;
    (b) from at least 1 to about 3 weight percent, by weight of the compound, of non-halogenated termini-functional chemical, wherein the non-halogenated termini-functional chemical is vinyl-terminated polydimethyl siloxane;
    (c) from at least 1 to about 1.29 weight percent, by weight of the compound, of non-halogenated hydride-functional polysiloxane, wherein the non-halogenated hydride-functional polysiloxane is selected from the group consisting of poly(methyl hydrosiloxane) homopolymer, methylhydrosiloxane-dimethylsiloxane copolymer, and combinations thereof; and
    (d) potassium 3-(phenylsulfonyl)benzenesulfonate;
    wherein the compound is formulated with completely non-halogenated ingredients; and
    wherein the compound achieves a V-1 rating or better when tested according to UL 94 at a thickness of 3.2 mm.

2. The compound of claim 1, further comprising platinum catalyst.

3. The compound of claim 1, further comprising a non-halogenated flame retardant.

4. The compound of claim 3, wherein the non-halogenated flame retardant is selected from the group consisting of bisphosphate esters, polyphosphonates, polyphosphazenes, and combinations thereof.

5. The compound of claim 1, further comprising talc.

6. The compound of claim 1, further comprising stabilizers.

7. The compound of claim 1, wherein the polycarbonate homopolymer is a mixture of a branched polycarbonate of virginal source, recycled source, or both, and a linear polycarbonate of virginal source, recycled source, or both.

8. An article shaped from the compound of claim 1.

\* \* \* \* \*